US007710955B2

(12) United States Patent
Marce et al.

(10) Patent No.: US 7,710,955 B2
(45) Date of Patent: May 4, 2010

(54) TAKING ACCOUNT OF INFORMATION RELATING TO THE ENVIRONMENT OF ACTIVE NODES WHEN DETERMINING THE CODE ASSOCIATED WITH AN ACTIVE APPLICATION

(75) Inventors: Olivier Marce, Massy (FR); Laurent Clevy, Chartres (FR); Carlo Drago, Paris (FR)

(73) Assignee: Alcatel, Paris (FR)

( * ) Notice: Subject to any disclaimer, the term of this patent is extended or adjusted under 35 U.S.C. 154(b) by 2406 days.

(21) Appl. No.: 10/197,402

(22) Filed: Jul. 18, 2002

(65) Prior Publication Data

US 2003/0016667 A1 Jan. 23, 2003

(30) Foreign Application Priority Data

Jul. 19, 2001 (FR) .................................. 01 09663

(51) Int. Cl.
*H04L 12/56* (2006.01)
*G06F 15/16* (2006.01)
(52) U.S. Cl. ........................ 370/389; 370/401; 709/219; 709/230
(58) Field of Classification Search ................. 370/386, 370/389, 395.21, 395.41, 400, 401; 709/203, 709/219
See application file for complete search history.

(56) References Cited

U.S. PATENT DOCUMENTS 6,021,438 A * 2/2000 Duvvoori et al. ............ 709/224
6,286,038 B1 * 9/2001 Reichmeyer et al. ........ 709/220
6,345,294 B1 * 2/2002 O'Toole et al. ............. 709/222
6,393,474 B1 * 5/2002 Eichert et al. ............... 709/223
6,529,515 B1 * 3/2003 Raz et al. .................... 370/401
6,697,863 B1 * 2/2004 Egawa et al. ................ 709/226
6,801,528 B2 * 10/2004 Nassar ........................ 370/389
6,950,847 B2 * 9/2005 Harrisville-Wolff et al. . 709/201
6,976,079 B1 * 12/2005 Ferguson et al. ............ 709/229
7,003,578 B2 * 2/2006 Kanada et al. .............. 709/230
7,171,661 B1 * 1/2007 Pinera et al. ................ 717/172
7,181,532 B1 * 2/2007 Chan .......................... 709/242
7,185,073 B1 * 2/2007 Gai et al. .................... 709/221
7,418,513 B2 * 8/2008 Chang et al. ................ 709/230

OTHER PUBLICATIONS

Kulkarni A B et al: "Implementation of a prototype active network" Open Architectures and Network Programming, 1998 IEEE San Francisco, CA, USA Apr. 3-4, 1998, New York, NY USA, IEEE, US Apr. 3, 1998, pp. 130-142.

Wetherall D J et al: "ANTS: a toolkit for building and dynamically deploying network protocols" Open Architectures and Network Programming, 1998 IEEE San Francisco, CA. USA Apr. 3-4, 1998, New York, NY, USA, IEEE, US Apr. 3, 1998, pp. 117-129.

(Continued)

*Primary Examiner*—Pankaj Kumar
*Assistant Examiner*—Marcus R Smith
(74) *Attorney, Agent, or Firm*—Sughrue Mion, PLLC

(57) ABSTRACT

We describe an active node, which receives an active message containing an active application identifier, transmits the active application identifier to an active applications server, receives associated code from the active applications server, and executes the associated code. The active node also may transmit to the active applications server information relating to its own environment, and information relating to whether it is an edge node or core node in the network, enabling the active applications server to determine the associated code to return to the active node.

25 Claims, 2 Drawing Sheets

OTHER PUBLICATIONS

A. Galis et al: "A flexible IP active networks architecture" Active Networks, Second International Working Conference, Oct. 18, 2000, pp. 1-15.

R. Cardoe et al: "LARA: a prototype system for supporting high performance active networking" Active Networks. First International Working Conference. Jul. 2, 1999, pp. 117-131.

* cited by examiner

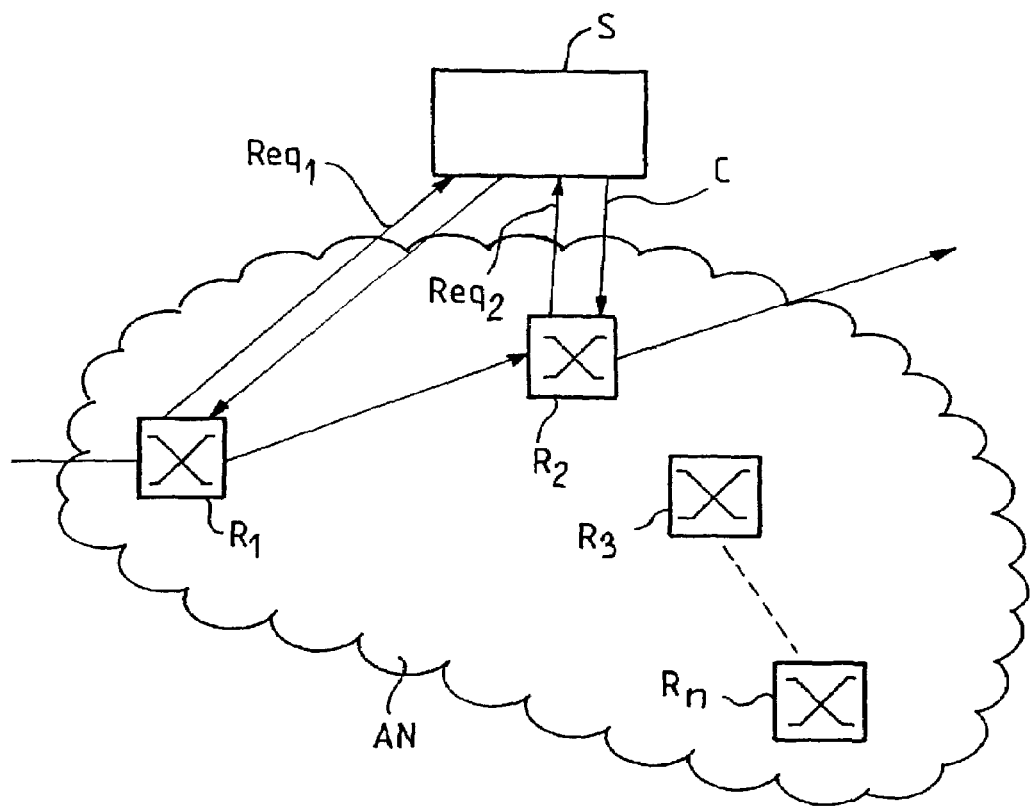

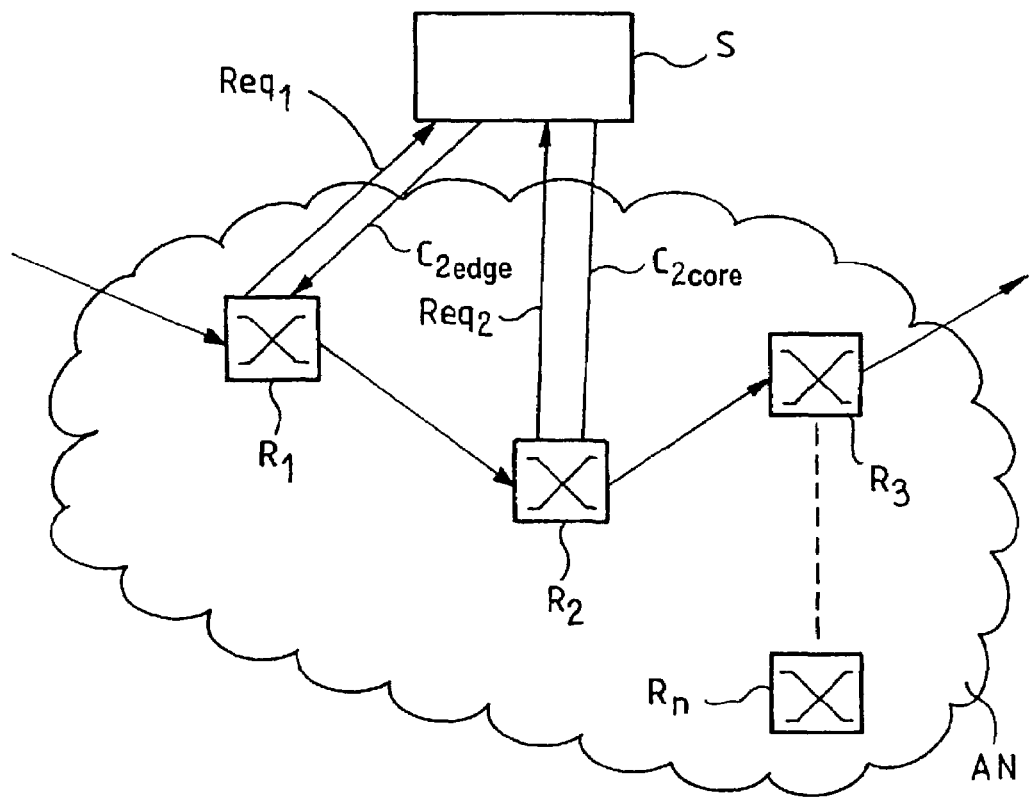

TAKING ACCOUNT OF INFORMATION RELATING TO THE ENVIRONMENT OF ACTIVE NODES WHEN DETERMINING THE CODE ASSOCIATED WITH AN ACTIVE APPLICATION

The present invention relates to telecommunications networks in which the nodes are capable of applying specific processing to the information messages they receive.

The invention applies particularly to active networks.

BACKGROUND OF THE INVENTION

The concept of an active network was put forward in the work by the Defense Advanced Research Projects Agency (DARPA) in 1994 and constitutes the subject of several international conferences, for example International Workshop on Active Networks, IWAN 99 or IWAN 2000.

An active network is a network in which the nodes, or at least some of them, are capable of applying specific processing to some of the messages conveyed by the network. In other words, this means that such nodes must be capable of running an algorithm other the algorithms that have been available to them since their original design.

Within an active network, all nodes are not necessarily provided with this processing ability: one can thus distinguish between active nodes and non-active nodes (i.e. normal nodes).

In the same way, not all messages necessarily require specific processing: one can thus distinguish between active messages (or packets) and non-active (or normal) messages.

In conventional manner, an active message may contain an identifier of an active application. On receiving an active message, an active router can execute the code associated with said active application.

Nevertheless, an active node has limited storage resources, while the number of active applications is, a priori, unlimited.

Thus, one solution in the state of the art consists in providing a server of active applications such that on receiving an active message, an active node contacts the active applications server in order to download the code that corresponds to the active application identified by the active message.

Nevertheless, that state-of-the-art solution is insufficient since it assumes that an active application has only one possible code corresponding thereto. Unfortunately, the Applicant has observed that a given active application can give rise to different codes as a function of specific features of the active node.

For example, the various active nodes in an active network can possess different execution environments. This typically applies when they come from different suppliers and/or when they implement different operating systems (a proprietary operating system specific to a particular supplier, an operating system of the UNIX type, etc.).

Another example is the function of the active node. A conventional case is the distinction drawn between core routers (i.e. routers internal to a given network), and edge routers (i.e. routers at the boundaries of a network).

OBJECTS AND SUMMARY OF THE INVENTION

The object of the present invention is to enable specific features of the active network to be taken into account when determining which code corresponds to an active application.

To do this, in a first aspect, the present invention provides a node including means for receiving an active message, said active message containing an active application identifier, means for transmitting the active application identifier to an active applications server, and means for receiving associated code from said active applications server and for executing it. This node further comprises means for transmitting to said active applications server information relating to its own environment.

In a second aspect, the invention provides an active applications server including means for receiving an active application identifier from an active node, association means for determining an associated code depending on said active application identifier, and means for downloading said associated code to said active node. This active applications server further comprises means for receiving information relating to the environment of the active node and the association means determines the associated code as a function of said information.

Finally, in a third aspect, the invention provides a method of forwarding an active message via an active node, the method consisting in:

receiving the active message, the active message containing at active application identifier;

sending a request message to an active applications server, the message containing said active application identifier;

in the active applications server, determining an associated code as a function of the active application identifier;

downloading said associated code to the active node; and executing the associated code and forwarding the active message to a following active node.

In the method, the request message further contains information relating to the environment of the active node, and the associated code is determined as a function of said information.

In an implementation of the invention, the information relating to the environment comprises an identifier of the execution environment of the active node.

In an implementation of the invention, the information relating to the environment comprises an identifier of the core/edge characteristic of the active node.

In an implementation of the invention, the request message complies with the hypertext transfer protocol (HTTP).

BRIEF DESCRIPTION OF THE DRAWINGS

The invention and its advantages appear more clearly from the following description of implementations given with reference to the accompanying figures.

FIG. 1 shows a first implementation of the invention.

FIG. 2 is a diagram of the association means for said first implementation.

FIG. 3 shows a second implementation of the invention.

FIG. 4 is a diagram of the association means in the second implementation.

MORE DETAILED DESCRIPTION

FIG. 1 shows an active network AN made up of active nodes or "routers" $R_1, R_2, R_3, \ldots, R_n$.

An active message is received by the network and is transmitted via the active nodes of the network. Such an active node contains the identifier of an active application.

On receiving an active message, the active node $R_1$ sends a request message $Req_1$ to an active applications server S, which message contains the identifier of the active application. The node also transmits information relating to its own environment.

In this implementation, the environment information can comprise an identifier of the associated execution environment: operating system, available additional modules, supplier of the active node, . . . .

The applications server S possesses means for receiving both types of identifier and means for making associations between identifiers of active applications, information relating to the environments of active nodes, and associated code.

By way of example, the association means can be in the form of a correspondence table as shown in FIG. 2.

In the correspondence table T, the left-hand column represents identifiers of applications $A_1, A_2, A_3, \ldots, A_p$.

The middle column contains information relating to active nodes. In this embodiment, only the supplier of active nodes is taken into account in order to clarify the description. Two different suppliers $F_1$ and $F_2$ are shown.

The right-hand column represents the associated code. For example, it can be constituted by a pointer to memory space containing the code.

Thus, if the active message contains the identifier of application $A_2$ and if the active node $R_1$ comes from supplier $F_1$, then the associated code is the code $C_{21}$.

This associated code $C_{21}$ is then downloaded to the active node $R_1$ where it can be executed.

The active message can then be transmitted to node $R_2$. It is assumed that this active node comes from supplier $F_2$.

On receiving the active message, the active node then transmits a request message $Req_2$ containing both an identifier of its supplier $F_2$ and the identifier of the active application $A_2$. The active applications server S can then use the association means T shown in FIG. 2 to determine that the code for downloading is the code $C_{22}$. The node $R_2$ can then execute this code $C_{22}$ which is suitable for said node.

FIG. 3 shows a second implementation of the invention.

The active network AN comprises active nodes $R_1$, $R_2$, $R_3, \ldots, R_n$. The active nodes $R_1$ and $R_3$ are edge routers while the nodes $R_2$ and $R_n$ are core routers. Edge routers can communicate outside the network AN, whereas core routers communicate only with other nodes in the active network.

This distinction can have an influence on the architectures of these different types of node:
  core nodes are more specifically dedicated to routing messages and possesses increased routing hardware capacity to the detriment of software capacity; and
  in contrast, edge routers possess greater software capacity since they generally need to be able to implement a wider range of functions (controlling access, etc.).

When an active message is received by an edge router, for example $R_1$, it transmits both the identifier of the active application it contains and also information relating to its own environment, i.e. in this implementation of the invention, an identifier specifying the core/edge characteristic of the active node concerned.

Thus, when the active node $R_1$ receives an active message, it sends a request message $Req_1$ to the active applications server S, which message contains both an identifier of the active application contained in the active message it has received, and an identifier specifying the core/edge characteristic of the active node in question.

The active applications server S has means for receiving both of these types of identifier, and association means for determining associated code, as a function of the two identifiers.

One possible implementation of this association means is shown in FIG. 4. In this implementation, the association means is a correspondence table T.

The first column represents the identifier of the active application. In this example its value is either $A_1$ or $A_2$.

The second column represents the core node or edge node function. It can take two values: "edge" and "core".

Finally, the third column represents the associated code, $C_{1edge}$, $C_{1core}$, $C_{2edge}$, and $C_{2core}$.

If the active message received by $R_1$ contains the identifier of active application $A_2$, then the active node $R_1$ transmits to the active applications server S a request message $Req_1$ containing both said identifier of active application $A_2$ and the identifier of its own core/edge characteristic which in this case is "edge".

The active applications server S uses the association means T to determine that the associated code is the code $C_{2edge}$.

This code $C_{2edge}$ can then be downloaded to the requesting active node $R_1$ so as to be executed thereon.

The active node $R_1$ can then forward the active message to active node $R_2$ which is a core node (i.e. a node which does not possess any communications links to nodes situated outside the active network in question).

As before, on receiving the active message, the active node $R_2$ sends a request message $Req_2$ to the active applications server 2, which message contains both an identifier of the active application $A_2$ and an identifier of the nodes own core/edge characteristic, which in this case is "core".

As before, the active applications server S can use its association means T to determine that the associated code is the code $C_{2core}$.

The code $C_{2core}$ is then downloaded to the requesting active node $R_2$. The active node $R_2$ can then execute the code and forward the active message to the following node, for example active node $R_3$.

The invention is not limited to the above-described embodiments but can be applied to any kind of information concerning the environment of the active nodes.

Specifically, the invention applies to combining a plurality of types of information relating to the environments of active nodes.

For example, an active node can transmit both an identifier of its supplier and an identifier specifying its core/edge characteristic.

In a particular embodiment, communication between the active nodes and the active applications server, i.e. the request messages $Req_1$ and $Req_2$ takes place using the HTTP. In this embodiment, the information about the environment of the active node is transmitted to the active applications server using one of the methods that comply with the HTTP, and the corresponding active code is returned in a manner that is in compliance with said HTTP.

However the present invention is not limited to this implementation and it could be implemented using any other protocol for communication and data exchange. For example it could be an application protocol such as file transfer protocol (FTP) or a non-application protocol (communication by sockets, . . . ). It could also be a secure protocol such as the secure socket layer (SSL).

The invention claimed is:
1. An active node, comprising:
  means for receiving an active message, said active message containing an active application identifier;
  means for transmitting said active application identifier to an active applications server;

means for receiving associated code from said active applications server, said associated code comprising an active application identified by said active application identifier;

means for executing said associated code; and means for transmitting to said active applications server information relating to an environment of said active node.

2. An active node according to claim 1, wherein said information relating to an environment of said active node comprises an identifier of the execution environment of said active node.

3. An active node according to claim 1, wherein said information relating to an environment of said active node comprises information indicating whether said active node is a core or an edge node.

4. An active applications server comprising:

means for receiving an active application identifier from an active node;

association means for determining associated code depending on said active application identifier, said associated code comprising an active application;

means for transmitting said associated code to said active node; and means for receiving information relating to an environment of said active node;

wherein said association means determines said associated code as a function of said information relating to an environment of said active node.

5. An active applications server according to claim 4, in which said information relating to an environment of said active node comprises an identifier of the execution environment of said active node.

6. An active applications server according to claim 4, in which said information relating to an environment of said active node comprises information indicating whether said active node is a core or an edge node.

7. A method of forwarding an active message via an active node, comprising:

receiving said active message, said active message containing an active application identifier;

sending a request message to an active applications server, the message containing said active application identifier;

receiving associated code from said active applications server, said associated code determined by said active applications server as a function of said active application identifier;

executing said associated code; and forwarding the active message to a following active node;

wherein said request message contains information relating to an environment of said active node, and the associated code is determined by said active applications server as a function of said information.

8. A method according to claim 7, in which said information relating to an environment of said active node comprises an identifier of the execution environment of said active node.

9. A method according to claim 7, in which said information relating to an environment of said active node comprises information indicating whether said active node is a core or an edge node.

10. A method according to claim 7, in which said request message complies with the HTTP protocol.

11. A method according to claim 7, wherein said active node comprises a router.

12. A method according to claim 7, wherein said active message is received from a source active node.

13. A method according to claim 12, wherein said source active node comprises a router.

14. A method according to claim 7, wherein said active node executes said active application to manage network traffic.

15. An active node according to claim 1, said active node comprising a router.

16. An active node according to claim 1, wherein said active message is received from a source active node.

17. An active node according to claim 16, wherein said source active node comprises a router.

18. An active node according to claim 1, wherein said active node executes said active application to manage network traffic.

19. An active node according to claim 1, wherein said active node forwards said active message to a following active node.

20. A according to claim 4, wherein said active node comprises a router.

21. A server according to claim 4, wherein said active message is received from a source active node.

22. A server according to claim 21, wherein said source active node comprises a router.

23. A server according to claim 4, wherein said active node executes said active application to manage network traffic.

24. A server according to claim 4, wherein said active node forwards said active message to a following active node.

25. An active node according to claim 1, wherein said associated code is determined by said active applications server as a function of said information relating to an environment of said active node.

* * * * *